(12) United States Patent
Heidelmann et al.

(10) Patent No.: US 8,932,105 B2
(45) Date of Patent: Jan. 13, 2015

(54) METHOD FOR THE MACHINING OF GEAR TEETH, WORK PIECE WITH GEAR TEETH, AND MACHINE TOOL

(75) Inventors: Wilfried Heidelmann, Ludwigsburg (DE); Dragan Vucetic, Bergheim (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 881 days.

(21) Appl. No.: 13/154,638

(22) Filed: Jun. 7, 2011

(65) Prior Publication Data

US 2012/0009848 A1 Jan. 12, 2012

(30) Foreign Application Priority Data

Jun. 15, 2010 (DE) .......................... 10 2010 023 830

(51) Int. Cl.
*B23F 5/00* (2006.01)
*B24B 51/00* (2006.01)
*B23F 1/02* (2006.01)

(52) U.S. Cl.
CPC .... *B23F 5/00* (2013.01); *B23F 1/02* (2013.01)
USPC ............................................... 451/5; 451/47

(58) Field of Classification Search
CPC ......... B24B 51/00; B23F 23/006; B23F 1/02; B23F 13/006; B23F 5/163
USPC ................... 451/5, 47, 11, 8, 9, 10
See application file for complete search history.

(56) References Cited

U.S. PATENT DOCUMENTS

| | | | |
|---|---|---|---|
| 4,954,027 A | | 9/1990 | Faulstich |
| 6,012,972 A | * | 1/2000 | Jankowski ........................ 451/48 |
| 6,077,150 A | * | 6/2000 | Jankowski ........................ 451/47 |
| 6,491,568 B1 | * | 12/2002 | Jankowski ........................ 451/5 |

FOREIGN PATENT DOCUMENTS

| | | |
|---|---|---|
| DE | 3816270 A1 | 11/1989 |
| DE | 4112122 A1 | 10/1991 |

OTHER PUBLICATIONS

T. Bausch et al., "Innovative Zahnradfertigung", Expert Verlag, Jan. 1, 2006, pp. 534-537, ISBN-13: 978-3-8169-1871-4.
Extended European Search Report (with English translation) for EP 11003931.0.

* cited by examiner

*Primary Examiner* — Robert Rose
(74) *Attorney, Agent, or Firm* — Robert L. McDowell

(57) ABSTRACT

Method for the machining of gear teeth whose tooth flanks deviate from their specified geometry by a machining allowance, wherein the machining allowance is removed through an infeed of at least two infeed steps, each of which is followed by a machining pass with a profiling tool that rotates about a tool axis, wherein for this operation the profiling tool—after it has been set to a position relative to the gear wheel that depends on the angle at which the plane of rotation of the tool which is orthogonal to the tool axis is tilted against the axis of the gear wheel—is brought into engagement with the gear teeth, wherein after each infeed step the material within the resultant engagement area of the tool is removed, wherein after the last infeed step with a tilt angle setting of the profiling tool that is determined by the design angle of the latter, the area of tool engagement extends over the entire flank height, so that the next machining pass will remove the amount of material required to attain the specified geometry, wherein in at least one infeed step which precedes the last infeed step, the profiling tool is set to a tilt angle which deviates from the angle that the tool was designed for and which results in a tool engagement area which, in comparison to the setting at the designed angle, is enlarged in the direction of the flank height.

30 Claims, 7 Drawing Sheets

Figure 1:
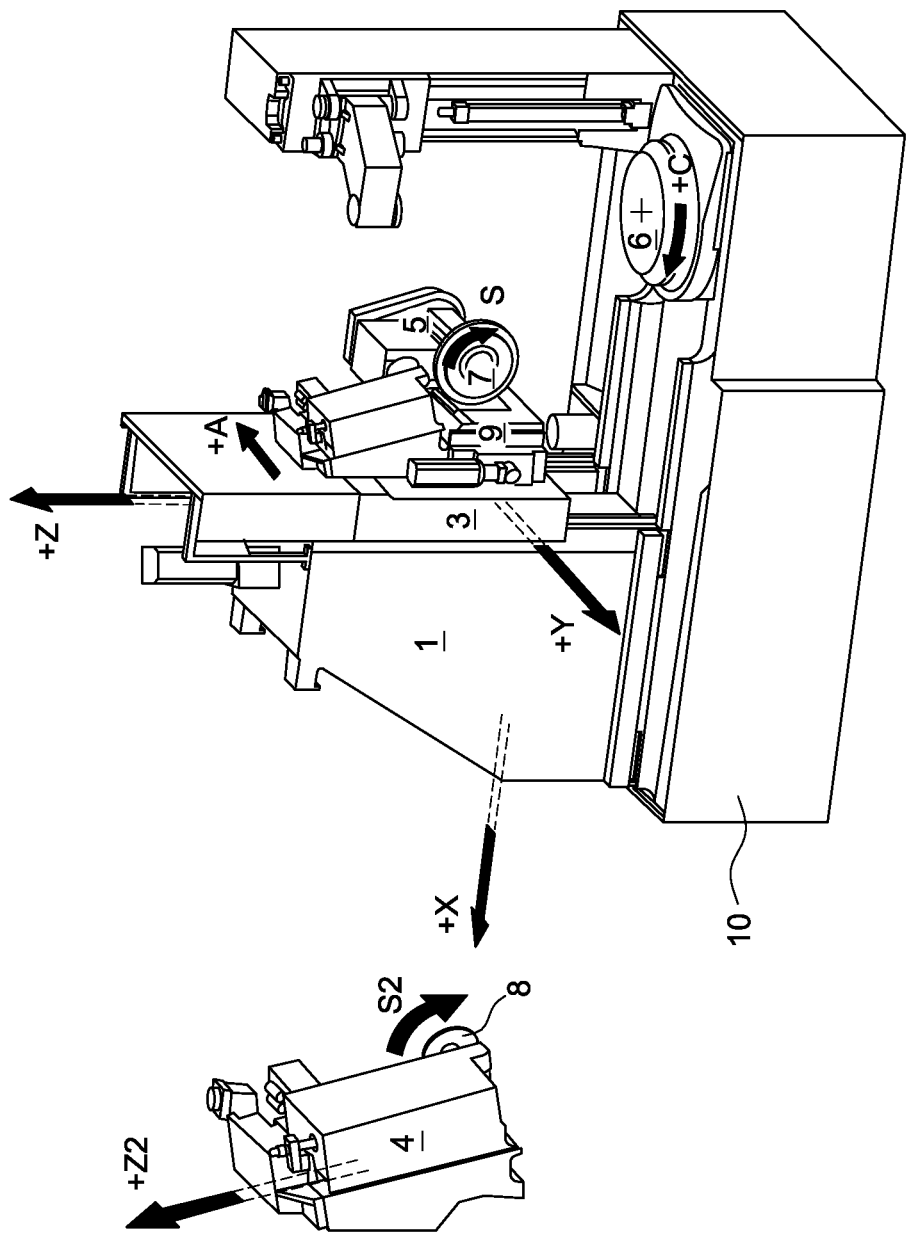

METHOD FOR THE MACHINING OF GEAR TEETH, WORK PIECE WITH GEAR TEETH, AND MACHINE TOOL

The invention concerns a method for the machining of gear teeth whose tooth flanks deviate by a machining allowance from their specified geometry, wherein the machining allowance is removed with an infeed of at least two infeed steps, each of which is followed by a machining pass with a profiling tool that rotates about a tool axis, wherein for this operation the profiling tool —after it has been set to a position relative to the gear wheel that depends on the angle at which the plane of rotation of the tool which is orthogonal to the tool axis is tilted against the axis of the gear wheel —is brought into engagement with the gear teeth, wherein after each infeed step the material within the resultant engagement area of the tool is removed, wherein after the last infeed step and with a tilt angle setting of the profiling tool that is determined by the design of the latter, the area of tool engagement extends over the entire flank height, so that the next machining pass will remove the amount of material required to attain the specified geometry. In addition, the invention concerns a machine tool capable of executing the method, and a gear produced according to the method.

Methods of this kind belong to the known state of the art and are described for example in Thomas Bausch et al., *"Innovative Zahnradfertigung", Expert Verlag*, 3. Auflage (Thomas Bausch et al., "Innovative Gear Wheel Manufacturing", Expert Publications, $3^{rd}$ Edition), wherein on pp. 534 to 537 the process of profile grinding is discussed as an example of a discontinuous profiling method of this kind.

In FIG. 15.2-1, on page 534, the use of a profile grinding wheel for grinding the tooth flanks of a helically toothed gear is illustrated. As shown there, the plane of rotation of the tool is tilted relative to the axis of the gear wheel. Normally, the tilt angle for this operation is set so that it matches the helix angle of the gear teeth, and the profile of the tool is designed accordingly for the machining at this tilt angle. However, in order to cover a wider grinding path it is also a known technique to perform the machining under a tilt angle that differs from the helix angle, in which case the tool profile is designed for this machining tilt angle.

Particularly in FIG. 15.2-5 on page 536, the example of a radial infeed in three equidistant infeed steps is used to explain that after the first infeed step in the height direction of the tooth, the engagement of the appropriately profiled tool covers only the area at the foot of the tooth flank and reaches the area at the head of the tooth flank only in the course of the further infeed steps. In the axial direction, the area of tool engagement extends over the entire tooth width.

In order to remove the material at a more uniform rate over the height of the flanks, the grinding wheel is re-profiled after each individual infeed step, as explained on page 536 of the cited reference. As an alternative, several grinding wheels are used in succession, wherein each grinding wheel has the profile required to generate the geometry of the tooth flanks that needs to be attained in the respective infeed step.

However, these procedures require more complex operating steps and, accordingly, take more time for the machining process to reach the point where the specified geometry of the tooth flanks will have been attained.

The term "specified geometry" as used in the patent claims means the targeted geometry that is to be generated by the machining process. This can be the final geometry of the finished gear wheel, or it can also represent an intermediate geometry, for example a geometry to be achieved by rough machining, while the final geometry is produced through one or more subsequent finishing steps. Accordingly, the entire flank height covered by the area of tool engagement after the last infeed step relates to the flank height of the targeted geometry, which need not necessarily agree, but could agree, with the total flank height of the final geometry of the gear teeth.

In view of the problems inherent in the state of the art as explained above, the present invention is motivated by the objective to improve the aforementioned process, so that with a limited expenditure of labor/time, a rate of material removal is achieved which is more uniform over the height of the flank.

This task is solved by the invention through a further developed version of a method of the kind mentioned in the introduction, whose distinguishing attribute is in essence that in at least one infeed step which precedes the last infeed step, the profiling tool is set to a tilt angle that deviates from the angle that the tool was designed for and results in a tool engagement area which, in comparison to the setting at the designed angle, is enlarged in the direction of flank height.

The invention is based on the observation that the orientation of tool and gear wheel in relation to each other, which is normally indicated by the tilt angle, i.e. the angle by which the tool axis is tilted relative to the normal plane of the gear wheel axis, can be used as a degree of freedom for the infeed in order to achieve an improved tool engagement area after at least one infeed step that precedes the last infeed step, without having to re-profile the tool or having to use a different tool for this purpose. With the more even removal of material, the danger of overheating the work piece is reduced without slowing down the manufacturing process.

Nevertheless, the method according to the invention does not exclude that a tool may also be re-profiled during the work process. However, no re-profiling takes place between the at least one infeed step preceding the last infeed step and the last infeed step, meaning that in the work phase after the at least one preceding infeed step, the profiling tool has the profile designed for the tilt angle in the last infeed step.

With preference, the at least one preceding infeed step includes the first infeed step of the machining process. In contrast to the prior-art method, where the area of tool engagement in the first machining pass is relatively small in comparison to the subsequent passes, this version of the method according to the invention delivers the largest gain right at the beginning of the process.

As a recommended practice, deviating tilt angles are adjusted over several infeed steps and approach the design angle in a monotonic sequence, in particular a strictly monotonic sequence. Thus, the advantage to be gained from the invention is realized not only at the beginning of the machining process, but over the entire process or at least part of the process.

The method according to the invention proves particularly advantageous for true helically toothed gear wheels with a helix angle different from zero. However, at least a partial benefit can also be achieved for spur gears.

Preferably, the deviating tilt angle is selected dependent on the magnitude of the design angle and/or helix angle. Other parameters to be taken into account can include the number of teeth, pitch and pressure angle of the gear teeth as well as the diameter of the profiling tool. The limit for the maximum deviation of the design angle from the helix angle depends on the tool diameter, as the tool must not become too narrow or too sharp at its outside border.

In a preferred version of the method, the design angle is selected to be of a larger absolute amount than the helix angle. In comparison to a tool that is designed for the helix angle, for example a profile-grinding wheel, the tool according to this selection is narrower at its outer border area which grinds the part of the tooth flanks closest to the foot of the tooth and wider in the area which grinds the part of the tooth flanks closest to the top of the tooth.

It is envisioned that in the latter case the magnitude of the deviating tilt angle is selected smaller than the magnitude of the design angle. In comparison to the conventional method, this results in an even smaller axis distance for scraping contact, and a smaller infeed with correspondingly shorter machining times is made possible.

In a further version of the method, the design angle is selected to be of a smaller absolute amount than the helix angle. In this case, the amount of the deviating tilt angle should be larger than the amount of the design angle.

The invention can be used with tangential infeed. Preferred, however, is a radial infeed, which also simplifies the application of a dual-flank process.

In principle, it is possible to determine the deviating angle empirically. Preferably, however, the deviating tilt angle is determined mathematically.

It is particularly preferred to select for each infeed step the amount of infeed that works best with the tilt angle set for this step. By matching the amount of infeed to the tilt angle in this way, the extent to which the engagement area is enlarged can be influenced and optimized.

When matching the infeed to the tilt angle, it is further recommended practice to take a relationship into account which can be determined after the design angle has been selected, whereby a quantity, specifically two quantities, of the tooth flank geometry depend on a quantity, specifically two quantities, that are associated with controllable axes of movement of the tool and/or the work piece. The preferred choices for quantities associated with the flank geometry are the machining allowance and/or the profile angle deviation, while for the quantities associated with the axes of movement, the preferred choices are a quantity related to the tilt angle and/or a quantity related to the infeed parameter, i.e. for example the difference between the deviating tilt angle and the design angle and/or a deviation of the infeed parameter from the maximally possible infeed. The profile angle deviation $f_{H\alpha}$ is defined in the German industry standard DIN 3960. The machining allowance is measured for example at the pitch circle in the center of the tooth width.

When matching the infeed to the tilt angle, it is especially preferred to rely on the criterion that a profile angle deviation has been reached which lies below a specified first threshold, in particular that the profile angle deviation has vanished entirely. The smaller the profile angle deviation, the more uniformly the material will be removed. Accordingly, with a vanishing profile angle deviation the area of engagement reaches a maximum.

In a particularly preferred implementation of the method, the mathematical procedure for determining, i.e. adjusting, the infeed, contains iterative mathematical operations. This makes it possible to also use nonlinear dependencies of the kind mentioned above. The input quantity that is used for the mathematical determination of the k-th infeed step is for example the amount of the machining allowance desired after the k-th pass of the tool. The following partial steps are used with preference in a cycle of the iteration:

determining the amount of infeed associated with the machining allowance obtained as a result of the preceding iteration cycle, based on the relationship through which the machining allowance depends on the infeed parameter, wherein for the first cycle at the beginning of the iteration, the machining allowance to be achieved after the respective machining pass is used as point of departure;

based on the relationship through which the profile angle deviation depends on the infeed parameter, determining the profile angle deviation associated with the amount of infeed determined in the preceding step;

based on the relationship through which the profile angle deviation depends on the tilt angle, determining the amount of deviation from the design angle which results in a profile angle deviation of equal amount but opposite sign relative to the profile angle deviation determined in the preceding step;

based on the relationship through which the machining allowance depends on the tilt angle, determining a machining allowance correction associated with the deviation from the design angle as determined in the preceding step, and obtaining a machining allowance by subtracting the machining allowance corrections determined in the preceding step from the machining allowance that is to be attained after the respective machining pass, wherein the machining allowance obtained in this way is used as the basis for the next iteration cycle.

As a criterion for terminating the iteration, a second threshold can be set so that the iteration is terminated if the sum of the machining allowance entered at the beginning of an iteration cycle and the machining allowance correction obtained in this cycle differs from the machining allowance entered as input quantity for the iteration by less than the amount of the second threshold. The second threshold can be specified in the form of an arithmetic precision of, for example, $10^{-6}$.

It is conceivable in some cases that the matching of the infeed includes a linearization of the dependencies between the quantities characterizing the flank geometry and the quantities associated with the axes of movement. The arithmetic determination of the infeed quantities can thereby be simplified, as it amounts to solving the system of equations obtained from the linearization.

The method can be a single-flank process, but in particular with radial infeed a dual-flank method is preferred.

Furthermore, besides the machining of an external gear it is also being envisioned to machine internal gears.

Also, for additional time savings, a process of machining multiple flanks simultaneously is being considered, using either multiple tools or an appropriately designed multi-flank tool.

According to a further possibility, during the working pass of the tool in the direction of the gear axis a modification of the tilt angle between the tool axis and the normal plane of the gear axis can be superimposed on the tilt angle of the tool which has been set with the infeed. This modification can be used for example if the design calls for a dimension of the gear teeth to vary in the direction of the gear axis, for example to generate a crowning of the teeth.

The discontinuous profiling method according to the invention covers in particular the process of profile grinding and can also encompass profile bobbing.

From an apparatus-oriented point of view, the invention provides a machine tool for the machining of gear teeth, with a work piece spindle defining the direction of the gear axis and designed to hold the gear, with a tool spindle defining the direction of the tool axis and designed to hold the tool, wherein the tool spindle can be tilted by a tilt angle relative to the normal plane of the gear axis, and with a controller unit which controls the axis movements of the device, wherein further the machine tool is in essence distinguished by the fact that the controller unit is operable to execute a method of one of the versions described above, i.e. that the controller unit is programmed accordingly.

Within this context, the invention also claims protection for a computer software program for the control of a machine tool, wherein when the computer software program is executed in a controller unit of a machine tool, the latter is controlled by the program so as to carry out a method with the features according to the foregoing description.

Finally, the invention claims protection for a gear having a tooth flank geometry which was generated by using on of the afore-described versions of the method.

Further features, details and benefits of the invention will be evident from the following description of the attached drawings, wherein FIG. 1 shows a machine tool with its machine axes, FIG. 2 schematically illustrates settings of the angle between the tool and the gear wheel, FIGS. 3a to 3d show graphs representing the dependencies used for the method according to the invention in a first implementation of the method (external gear, radial infeed), FIGS. 4a to 4d show analogous graphs for a second implementation of the method (external gear, radial infeed), FIGS. 5a to 5d show analogous graphs for a third implementation of the method (internal gear, radial infeed), FIGS. 6a to 6d show analogous graphs for a third implementation of the method (internal gear, tangential infeed), and FIGS. 7a to 7d show analogous graphs for a fourth implementation of the method (internal gear, tangential infeed).

Referring to the machine tool illustrated in FIG. 1, following is a description of the machine tool axes that are of relevance in the present context. On the right side (in reference to FIG. 1) of the machine bed 10, the work piece table 6 is arranged in a horizontal plane and is configured in the conventional way for the clamping of a work piece 2 (not shown in FIG. 1), for example an external gear. Accordingly, the gear axis Z, which has the same orientation as the direction of movement of the axial carriage 3 (which will be described hereinafter), is directed vertically. The rotary direction of the gear wheel 2 about the gear axis Z will be identified as C.

According to a design that is known per se, a radial carriage 1, arranged on the left side (in reference to FIG. 1) of the machine bed 10, is configured with linear mobility relative to the work piece table 6. The movement, which occurs in the radial direction relative to a gear 2 clamped to the work piece table 6, defines the radial direction X. The radial position of the radial carriage 1 represents an infeed parameter in one implementation of the inventive method.

On the radial carriage 1, an axial carriage 3 is arranged with the capability to be moved in an axial direction Z that is orthogonal to the radial direction X. The axial direction Z is also the direction of the gear axis.

Arranged on the axial carriage 3 with the ability to tilt on the latter is a further carriage mechanism with a carriage bed guiding the sliding movement of a tangential carriage 9, which can thus perform a further (third) linear movement. In the position shown in FIG. 1, the tangential carriage 9 is not tilted relative to the axial carriage 3, so that the movement axis Y of the tangential carriage is perpendicular to the X-Z plane. When the tangential carriage 9 is tilted in the tilt direction A, the tangential direction Y is tilted out of the normal plane of the Z-axis by the tilt angle A. The tilt movement thus takes place in a plane that is perpendicular to the radial direction X.

Arranged on the tangential carriage 9 is a tool head 5 with the tool spindle 7 oriented in the Y-direction (tool axis) and designed to hold a tool for the machining of the gear wheel 2 which is clamped onto the work piece table, wherein the tool in the illustrated examples is a profile-grinding wheel 0 (see FIG. 2). The profile-grinding wheel 0 thus extends perpendicular to the tool axis Y, so that the tilt angle between the plane of rotation of the grinding wheel and the gear axis Z equals the tilt angle A by which the tool axis Y is tilted out of the normal plane of the Z-axis (gear axis). The tool position in the tangential direction represents likewise a possible infeed parameter. The rotary direction about the tool axis is identified as S.

If the tilt angle is set to match the helix angle of the gear teeth, as in the conventional discontinuous profile-grinding of, e.g., a right-handed external helical gear, the tangential carriage 9 needs to be tilted for the right-handed helical gear (for example with a helix angle of $\beta=25°$) in the opposite direction of the arrow A in FIG. 1, while the tilt angle in the case of a left-handed helical gear carries a positive sign.

A further carriage 4 which is likewise part of the overall design, with a linear movement axis Z2 for a dressing device and a rotary axis S2 for the spindle of the dressing wheel 8 is not a necessary to define the invention and will therefore not be described further. The same applies to the drive mechanisms that power the respective linear movements along the axes X, Y, Z (Z2) and rotary movements about the axes Z, C, S, X, which will be familiar to professionals in this field.

Figure 2B:
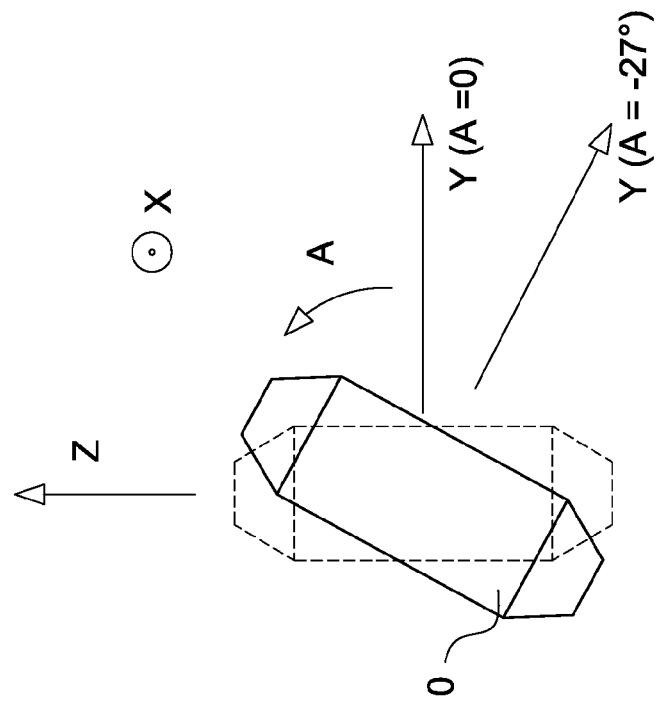
Figure 2A:
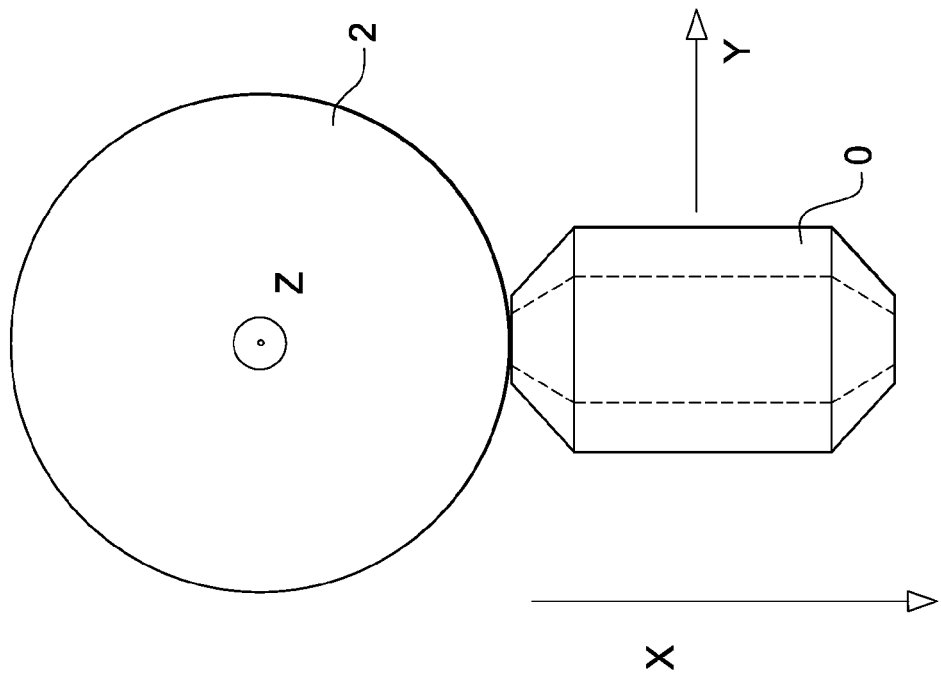

In FIGS. 2a and 2b, the relevant axes X, Y, Z, A are shown again schematically without machine parts, as seen from two different viewing directions. Drawn in broken lines is the profile-grinding disk in the non-tilted position, while the profile-grinding disk 0 drawn with solid lines is tilted by an angle $A=-27°$ for the grinding of a right-handed helical external gear.

With the machine axes having thus been defined, a first embodiment of the invention will now be described in more detail. A right-handed helical external gear ($\beta=25°$) is to be machined in a dual-flank process of discontinuous profile-grinding with radial (X) infeed. The profile-grinding wheel provided for this operation is designed in such a way that in order to generate the desired final flank geometry of the gear wheel 2, the grinding wheel will need to work at a tilt angle of $-27°$ in the last grinding pass, which means that the profile-grinding wheel is configured with a design angle or nominal angle of greater absolute magnitude than the helix angle, i.e. $|A_0|=27°>25°=\beta$. For conventional discontinuous profile-grinding, one would set a profile-grinding wheel of this configuration at a tilt angle of $-27°$ and use a series of equidistant infeed steps to remove the existing machining allowance q from the tooth flanks of the gear wheel 2 in process, as has already been explained in the introductory part of the description.

In contrast, according to a preferred practice of the invention, for the first infeed step the grinding disk 0 is set at a tilt angle A that differs from the design angle $A_0$, whereby a larger engagement area is obtained in relative terms between the profile-grinding wheel 0 and the gear wheel 2, and accordingly a uniform amount of material is removed over the grinding passes. In order to determine the tilt angle A that needs to be set, mathematically predictable dependencies are used between parameters of the tooth flank geometry and parameters that can be assigned to controllable movement axes of the tool and/or the work piece. With infeed in the radial direction X, the machining allowance q and the profile angle deviation $F_{H\alpha}$ are considered as the relevant parameters of the flank geometry, while the parameters which are assigned to the movement axes are represented by the tilt angle setting expressed as the difference $\delta A$ between the deviating tilt angle $A_1$ (for the first infeed step) and the design angle $A_0$, and the infeed parameter X expressed through its deviation $\delta X$ from the maximally possible infeed at which the final flank geometry is attained.

Figure 3A:
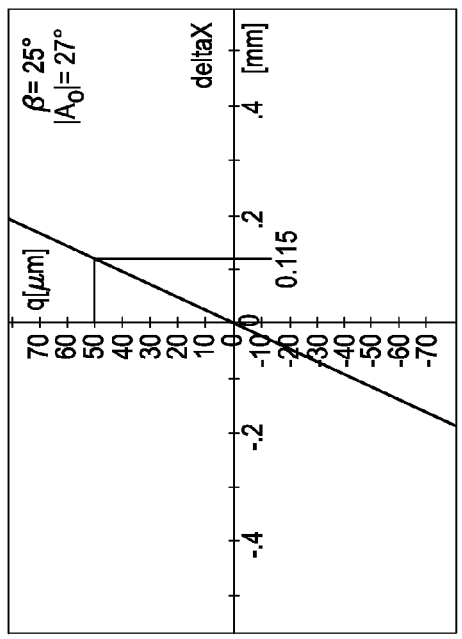
Figure 3B:
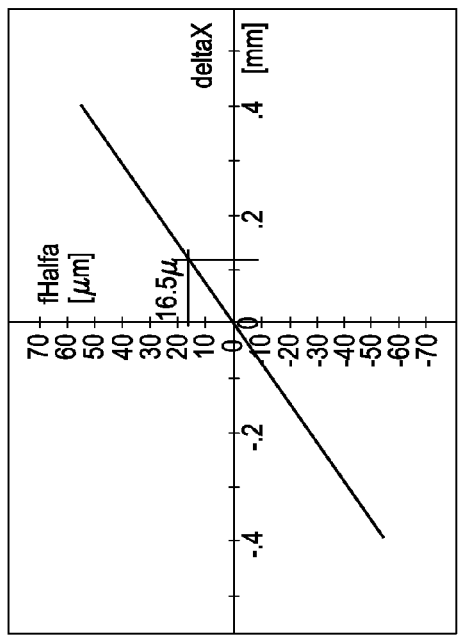
Figure 3D:
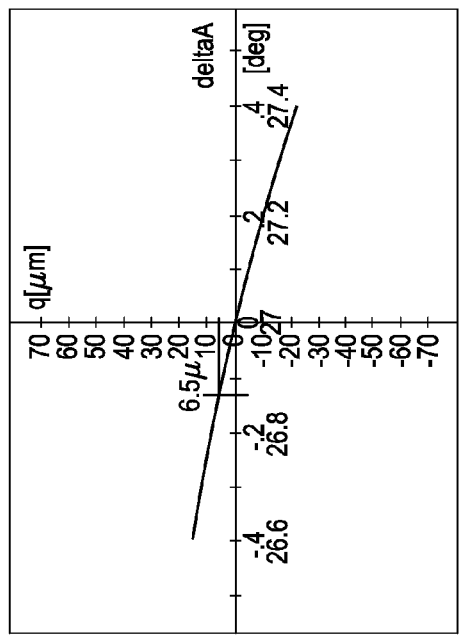
Figure 3C:
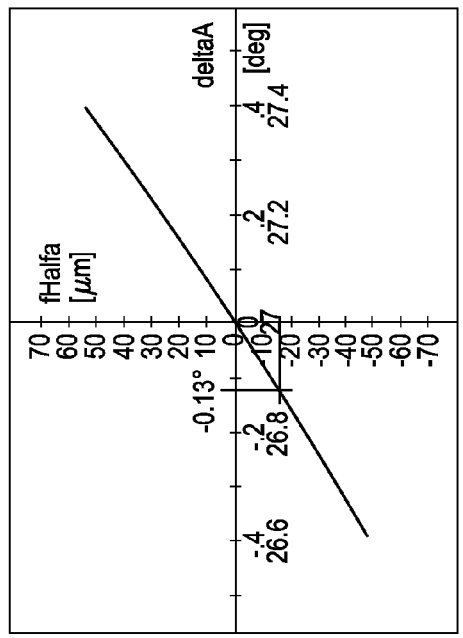
Figure 4A:
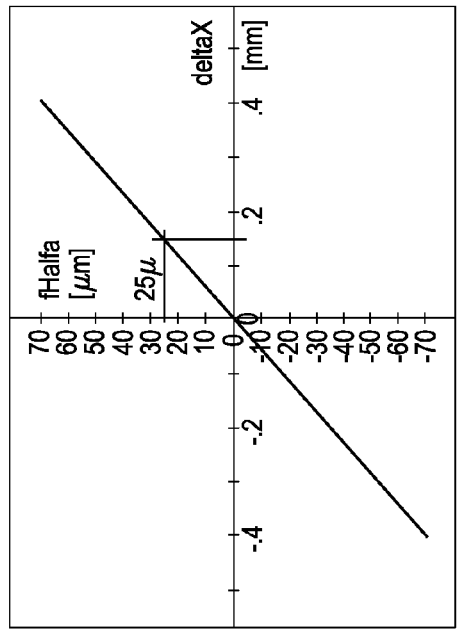
Figure 4B:
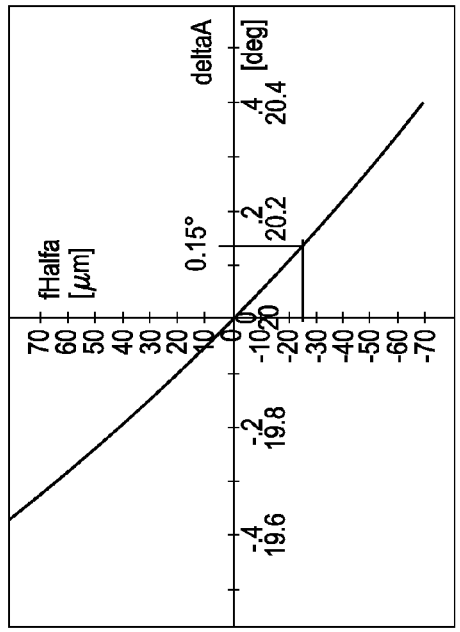
Figure 4C:
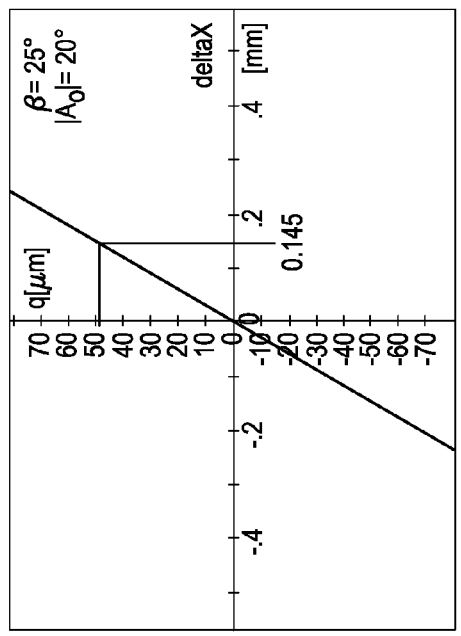
Figure 4D:
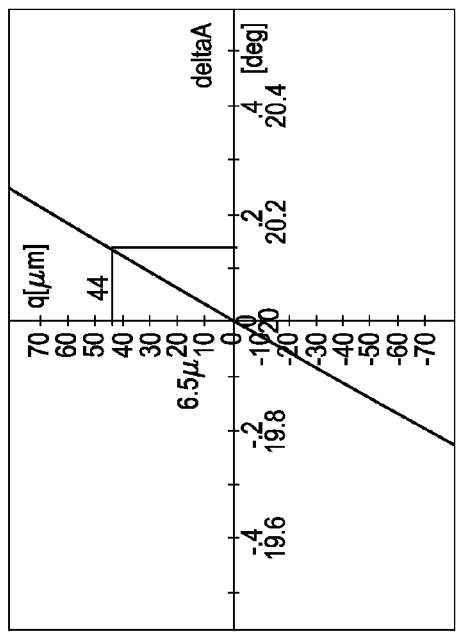
Figure 5B:
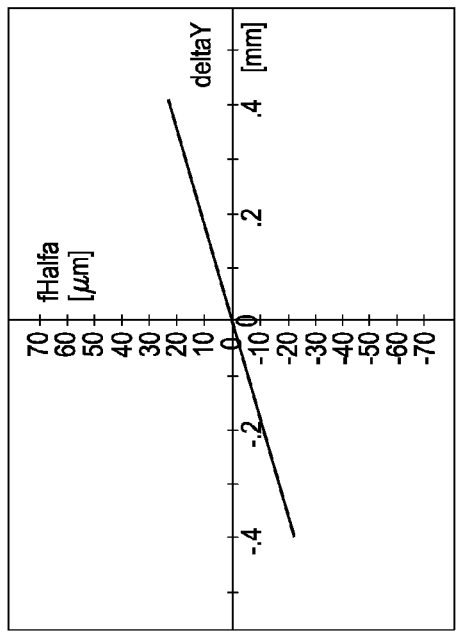
Figure 5C:
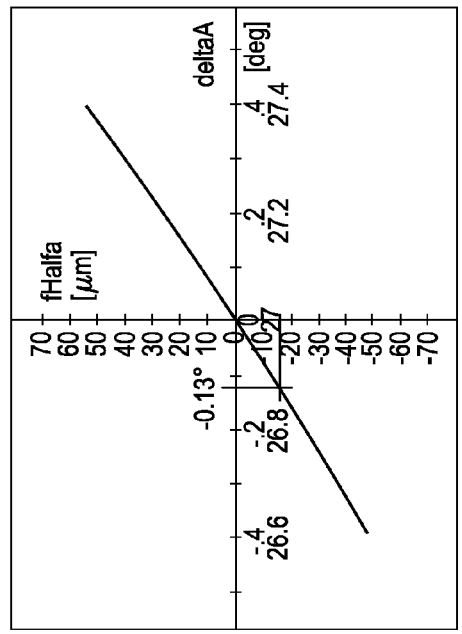
Figure 5A:
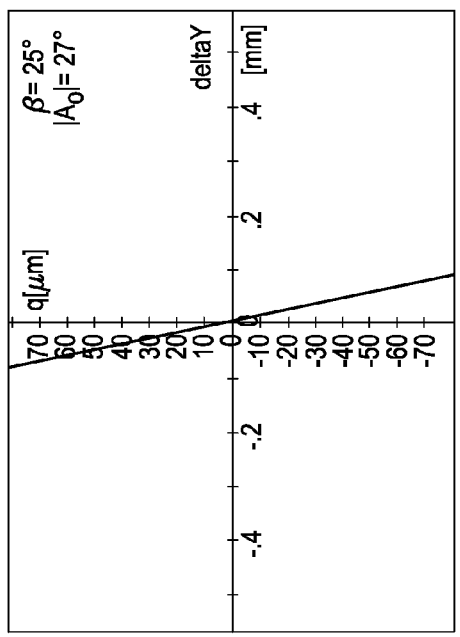
Figure 5D:
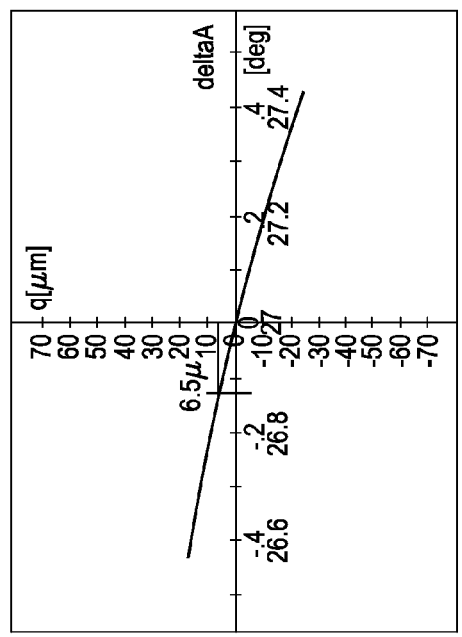
Figure 6A:
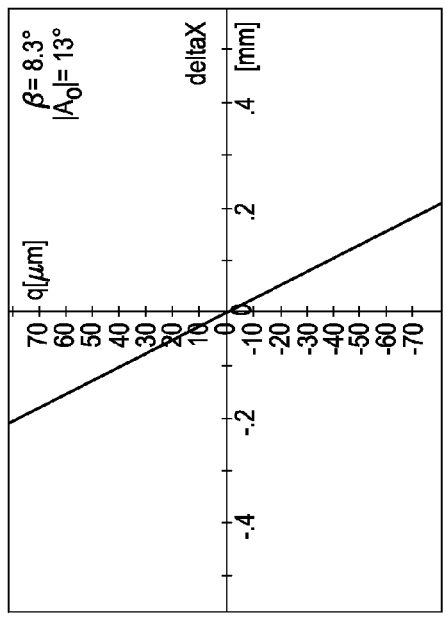
Figure 6B:
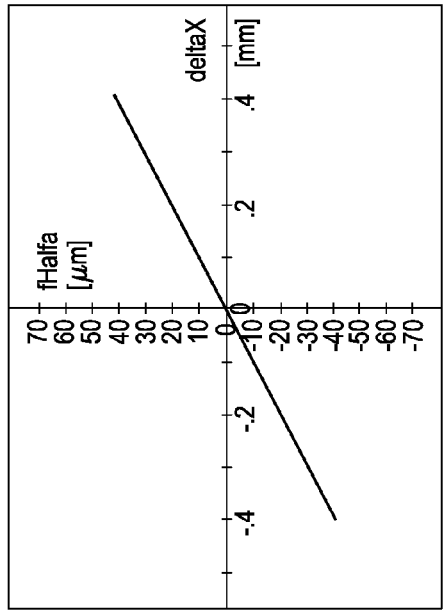
Figure 6C:
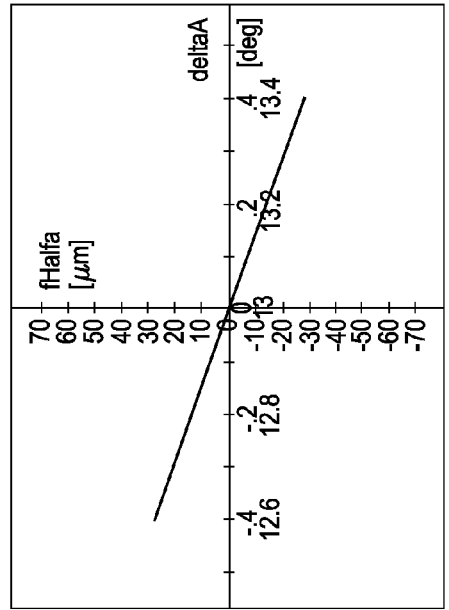
Figure 6D:
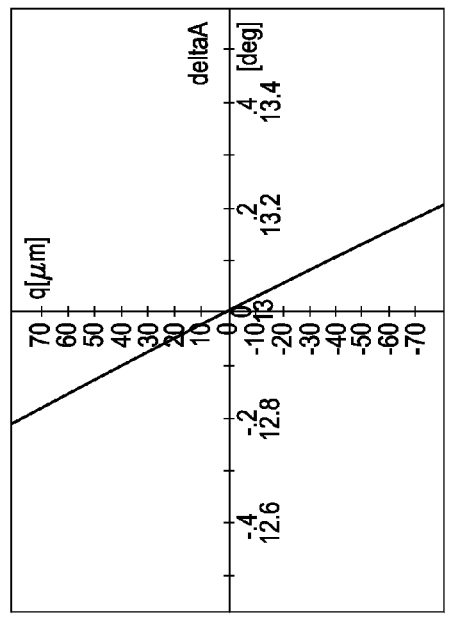
Figure 7A:
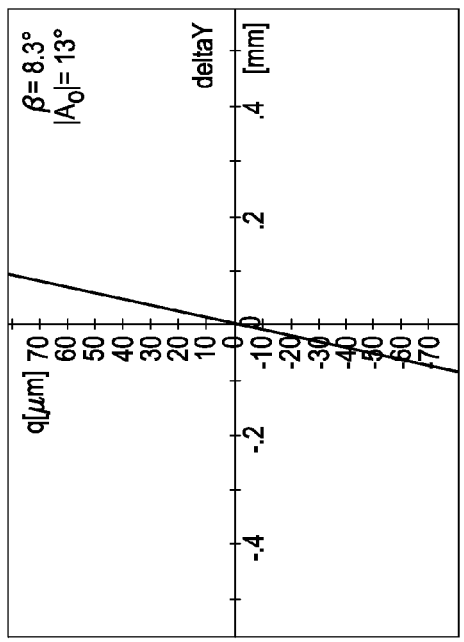
Figure 7B:
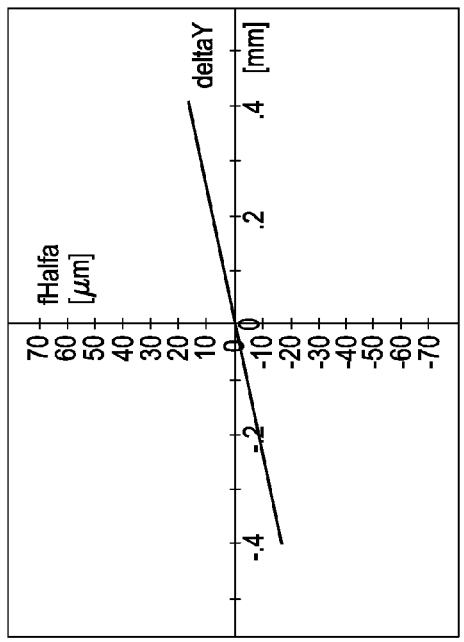
Figure 7C:
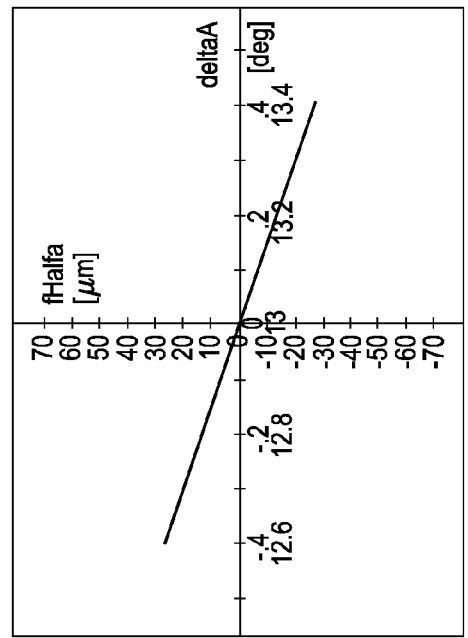
Figure 7D:
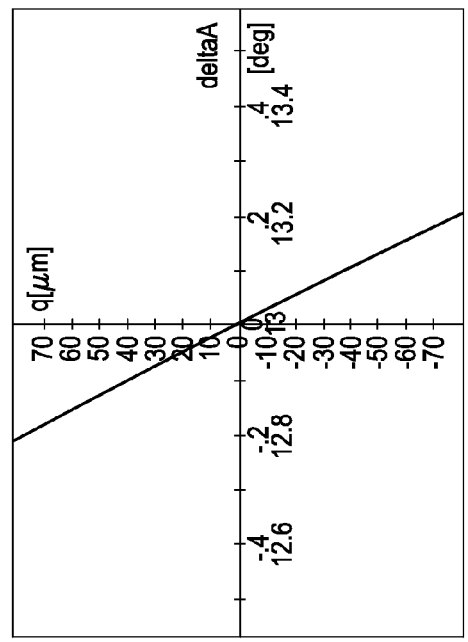

These dependencies can be calculated for a defined set of further parameters such as for example the number of teeth, the module and the pressure angle of the gear teeth as well as for the diameter of the grinding wheel and are visually represented in the graphs 3a to 3d for the machining allowance q and the profile angle deviation $f_{f_{i c y}}$, with FIG. 3a showing the dependency $q(\delta X)$, FIG. 3b showing the dependency $f_{H\alpha}(\delta X)$, FIG. 3c showing the dependency $f_{H\alpha}(\delta A)$, and FIG. 3d showing the dependency $q(\delta A)$. The first two graphs, 3a and 3b, are applicable in the case where the tilt angle $A_k$ is equal to the design angle $A_0$. The last two graphs, 3c and 3d, show the profile angle deviation $f_{H\alpha}$ and the machining allowance q that would be obtained after the last machine pass by setting throughout an angle A deviating by $\delta A$ from the design angle $A_0$.

Based on these dependencies, the tilt angle $A_1$ and the amount of infeed $\delta X_1$ for the first infeed step are now determined by cyclic iteration in such a way that, from a start where the machining allowance q to be attained after the first grinding pass is entered as an input quantity for the iteration, a profile angle deviation $f_{H\alpha}$ equal to zero is obtained. The first step of the iteration, if performed manually, can be described as follows: For a machining allowance of q=50 μm to be attained after the first grinding pass, FIG. 3a shows a difference of about 0.12 mm between the axis distance for scraping contact and the final axis distance. According to FIG. 3b, for $\delta X$=0.12 mm a profile angle deviation $f_{H\alpha}$ of about 17 μm would have to be anticipated. This profile angle deviation is to be compensated by a change of the tilt angle. For a compensatory profile angle deviation of −17 μm, the graph in FIG. 3c indicates that the magnitude of the tilt angle has to be reduced relative to the design angle by about 0.13°. However, the lookup value in FIG. 3d for the machining allowance resulting from this tilt angle correction is about 7 μm larger than the targeted amount. This means that the grinding wheel would be at the point of contact at an infeed of q=50+7=57 μm. However, as the point of contact should occur at an infeed of q=50 μm, the axis distance needs to be reduced accordingly for the next step of the iteration. Consequently, the iteration cycles are continued with a smaller axis distance for as long as it takes until a criterion of sufficient convergence is met, for example if the infeed correction resulting from the change of the tilt angle combined with the amount of infeed associated with the reduced axis distance deviates from the targeted amount of infeed by less than a specified threshold of, e.g., $10^{-2}$ μm. After each infeed and subsequent machining pass, a new calculation of the tilt angle can be made, starting from a new, reduced amount of infeed. In this process, the setting $A_k$ for the tilt angle will move successively closer to the design angle $A_0$ up to the last infeed step n, where the tilt angle $A_n$ is set equal to the design angle $A_0$. The machining allowance $q_k$ to be attained with a machining pass following an infeed step is thus given as the target. This can also occur automatically, for example in a sequence where an initial machining allowance of $q_0$=100 μm is removed in four roughing passes and one finishing pass, taking off 20 μm in each pass, down to the final geometry.

With radial infeed, if the iteration does not converge, then the difference between the magnitude of the design angle and the magnitude of the helix angle is not large enough. Accordingly a grinding wheel with a design angle of an appropriately selected larger magnitude should be used. A possible point of departure for selecting the design angle $A_0$ is an angle of a magnitude halfway between the helix angle β and the maximum design angle that is still compatible with the task of generating the desired flank geometry, taking into account the required thickness of the tool at its outer radius. Alternatively, this maximally possible design angle, which decreases for larger tool diameters, could be taken directly as the initial choice.

If the dependencies within the relevant range deviate only insignificantly from a linear relationship, as is approximately the case in FIGS. 3a to 3d, the iterative solution may be replaced by an alternative approach, wherein the unknown quantities are found by solving a system of linear equations $$\Omega x = b,$$

wherein the vector $x=(\delta X, \delta A)$ represents the unknowns, the vector $b=(q_{nom}, 0)$ represents the target values, and the matrix values $\Omega_{11}, \Omega_{12}, \Omega_{21}, \Omega_{22}$ represent the respective gradients in the graphs of FIGS. 3a, 3d, 3b, 3c (in this sequence).

However, if a linearization of this kind does not represent the dependencies with sufficient accuracy, it is preferred to stay with the computer-assisted iterative approach described above. Even if the target value for $f_{H\alpha}$ in the iterative approach is not set to zero, but to a (lower) threshold value which in any case will be smaller than the profile angle deviation one would have to expect after the first grinding pass with the conventional technique, the advantage remains that the material is removed more uniformly, and the range of convergence for the iteration is increased.

FIGS. 4a to 4d represent analogous dependencies as FIGS. 3a to 3d, illustrating the case where the grinding wheel is designed for a tilt angle of −20° in the last grinding pass, i.e. with a design angle of smaller absolute magnitude than the helix angle β, which is again selected to be 25° (right-handed external helical gear). While the gradients of the dependencies $f_{H\alpha}(\delta X)$ and $q(\delta X)$ remain unchanged in regard to their signs, the gradients of the dependencies $f_{H\alpha}(\delta A)$ and $q(\delta A)$ reverse their signs. However, the principle for calculating the tilt angle $A_k$ for each infeed with subsequent grinding pass k as well as for the respective amount of infeed remains the same. With a tangential infeed Y, it is possible to use design angles for the tool which lie within an interval containing the helix angle β. Thus, the tool can also be designed for the helix angle itself, an approach that yields less satisfactory results with infeed in the radial direction X.

FIGS. 5a to 5d represent the relevant dependencies to be considered with tangential infeed for the example of a right-handed helical external gear, wherein β=25°, with a design angle |$A_0$|=27°, i.e. the parameters of FIG. 3.

Finally, the analogous dependencies as in the preceding graphs are shown in FIGS. 6a to 6d for radial infeed and in FIGS. 7a to 7d for tangential infeed for the example of an internal gear with β=8.3° and a design angle with an absolute magnitude of 13°. The process of matching up dA and dX (dY) as explained above can also be performed in this case, starting from a machining allowance $q_0$ up to an amount exceeding 0.5 mm per flank.

The invention claimed is:

1. Method for the machining of gear teeth (2) whose tooth flanks deviate from their specified geometry by a machining allowance, wherein the machining allowance is removed through an infeed of at least two infeed steps (j), each of which is followed by a machining pass with a profiling tool (0) that rotates about a tool axis (Y), wherein for this operation the profiling tool (0) —after it has been set to a position relative to the gear wheel (2) that depends on the angle (A) at which the plane of rotation of the tool (0) which is orthogonal to the tool axis (Y) is tilted against the axis (Z) of the gear wheel (2) —is brought into engagement with the gear teeth, wherein after each infeed step the material within the resultant engagement area of the tool is removed, wherein after the last infeed step (n) with a tilt angle setting ($A_n = A_0$) of the profiling tool (0) that is determined by the design angle ($A_0$) of the latter, the area of tool engagement extends over the entire flank height, so that the next machining pass will remove the amount of material required to attain the specified geometry, characterized in that in at least one infeed step (k) which precedes the last infeed step (n), the profiling tool (0) is set to a tilt angle ($A_k$) that deviates from the angle ($A_0$) that the tool was designed for and results in a tool engagement area which, in comparison to the setting at the designed angle ($A_0$), is enlarged in the direction of the flank height.

2. Method according to claim 1, wherein the at least one preceding infeed step (k) comprises the first infeed step of the machining method.

3. Method according to claim 1 wherein in a plurality of infeed steps (j) deviating tilt angles (A) are set which approach the design angle in a monotonic sequence.

4. Method according to claim 1 wherein the gear is a genuine helical gear with a helix angle (β) different from zero, or a spur gear (β=0).

5. Method according to claim 1 wherein the deviating tilt angle ($A_k$) is selected dependent on the magnitude of the design angle ($A_0$) or the helix angle (β).

6. Method according to claim 5, wherein the design angle ($A_0$) is selected to be larger in absolute magnitude than the absolute magnitude of the helix angle (β).

7. Method according to claim 6, wherein the absolute amount of the deviating tilt angle ($A_k$) is selected smaller than the absolute amount of the design angle ($A_0$).

8. Method according to claim 5, wherein the design angle ($A_0$) is selected smaller than the helix angle (β) in terms of the absolute amounts of said angles.

9. Method according to claim 8, wherein the absolute amount of the deviating tilt angle ($A_k$) is selected larger than the absolute amount of the design angle ($A_0$).

10. Method according to claim 1 wherein the infeed steps take place in the tangential direction (Y).

11. Method according to claim 1 wherein the infeed steps take place in the radial direction (X).

12. Method according to claim 1 wherein the deviating tilt angle ($A_k$) is determined by way of a mathematical calculation.

13. Method according to claim 1 wherein the amount of infeed ($dX_k; Y_k$) that is used in the respective infeed step (k) is matched to the tilt angle ($A_k$) used in said step (k).

14. Method according to claim 12 wherein for the mathematical calculation a relationship is taken into account, whereby a quantity of the tooth flank geometry depend on a quantity that are associated with controllable axes of movement of the tool and/or the work piece.

15. Method according to claim 14, wherein the quantities that are taken into account as flank geometry quantities are the amount of infeed (q) or the profile angle deviation ($f_{H\alpha}$), and wherein the quantities that are taken into account as infeed quantities are the difference between the deviating tilt angle ($A_k$) and the design angle ($A_0$) or a deviation (dX;dY) of the infeed parameter (X;Y) from the maximally possible infeed.

16. Method according to claim 12 wherein the mathematical calculation is guided by the criterion of arriving at a profile angle deviation ($f_{H\alpha}$) lower than a given first threshold.

17. Method according to claim 12 wherein the mathematical calculation comprises iterative steps of arithmetic calculation.

18. Method according to claim 17, wherein the following are performed as partial steps of a cycle of iteration:
    determining the amount of infeed associated with the machining allowance obtained as a result of the preceding iteration cycle, based on the relationship through which the machining allowance depends on the infeed parameter, wherein for the first cycle at the beginning of the iteration, the machining allowance ($q_k$) to be attained after the respective machining pass is used as point of departure;
    based on the relationship through which the profile angle deviation depends on the infeed parameter, determining the profile angle deviation associated with the amount of infeed determined in the preceding step;
    based on the relationship through which the profile angle deviation depends on the tilt angle, determining the amount of deviation from the design angle which results in a profile angle deviation of equal amount but opposite sign relative to the profile angle deviation determined in the preceding step;
    based on the relationship through which the machining allowance depends on the tilt angle, determining a machining allowance associated with the deviation from the design angle as determined in the preceding step, and obtaining a machining allowance by subtracting the machining allowance corrections determined in the preceding step from the machining allowance ($q_k$) that is to be attained after the respective machining pass, wherein the machining allowance obtained in this way is used as the basis for the next iteration cycle.

19. Method according to claim 17 wherein as a criterion for terminating the iteration in a current infeed step (k), a second threshold is set so that the iteration is terminated when the absolute amount of the gap which separates the targeted machining allowance ($q_k$) from the sum of the machining allowance entered as input quantity in the preceding iteration cycle and the machining allowance correction obtained as a result falls below said second threshold.

20. Method according to claim 14 wherein the mathematical calculation comprises a linearization of the dependencies between the quantities defining the flank geometry and the quantities associated with the movement axes.

21. Method according to claim 20, wherein the mathematical calculation comprises the process of solving a system of equations obtained as a result of the linearization.

22. Method according to claim 1 wherein the machining method is a dual-flank method.

23. Method according to claim 1 wherein the machining is performed on an external gear.

24. Method according to claim 1 wherein the machining is performed on an internal gear.

25. Method according to claim 1 wherein a plurality of tooth flanks belonging to different tooth gaps of the gear (Z) are machined simultaneously with a plurality of tools (0) or with an appropriately designed multi-flank tool.

26. Method according to claim 1 wherein during the working pass of the tool in the direction of the gear axis, a modification of the tilt angle (A) between the tool axis (Y) and the normal plane of the gear axis (Z) can be superimposed on the tilt angle (A) of the tool which has been set with the infeed.

27. Method according to claim 1 wherein the machining under the discontinuous profiling method comprises profile-grinding or profile hobbing.

28. Machine tool for the machining of a gear wheel (2), with a work piece spindle defining the direction of the gear axis (Z) and designed to hold the gear wheel, with a tool spindle defining the direction of the tool axis (Y) and designed to hold a tool (0), wherein the tool spindle can be tilted by a tilt angle (A) relative to the normal plane of the gear wheel axis (Z), and with a controller unit which controls the axis movements of the device, characterized in that the controller unit is operable to execute a method according to claim 1.

29. Computer software program for the control of a machine tool, characterized in that said computer software program, when executed in a controller unit of a machine tool, controls the latter in carrying out a method according to claim 1.

30. Gear wheel having a tooth flank geometry which was generated by following a method according to claim 1.

* * * * *